(12) United States Patent
Kozlova et al.

(10) Patent No.: US 9,053,098 B2
(45) Date of Patent: *Jun. 9, 2015

(54) INSERTION OF TRANSLATION IN DISPLAYED TEXT CONSISTING OF GRAMMATICAL VARIATIONS PERTAINING TO GENDER, NUMBER AND TENSE

(75) Inventors: Elvira Kozlova, Moscow Region (RU); Dmitry Levchenko, Moscow Region (RU)

(73) Assignee: ABBYY Development LLC (RU)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,644

(22) Filed: May 25, 2012

(65) Prior Publication Data

US 2012/0245922 A1  Sep. 27, 2012

Related U.S. Application Data

(63) Continuation-in-part of application No. 13/006,813, filed on Jan. 14, 2011.

(60) Provisional application No. 61/294,947, filed on Jan. 14, 2010.

(51) Int. Cl.
| | |
|---|---|
| *G06F 17/28* | (2006.01) |
| *G09G 5/00* | (2006.01) |
| *G06K 9/18* | (2006.01) |
| *G06F 3/0485* | (2013.01) |
| *G06F 3/01* | (2006.01) |

(52) U.S. Cl.
CPC ............ *G06F 17/289* (2013.01); *G06F 3/0485* (2013.01); *G06F 3/018* (2013.01)

(58) Field of Classification Search
CPC .... G06F 17/289; G06F 3/04845; G06F 3/018
USPC ......................................................... 704/4, 7
See application file for complete search history.

(56) References Cited

U.S. PATENT DOCUMENTS

| | | | | |
|---|---|---|---|---|
| 5,349,368 | A * | 9/1994 | Takeda et al. .................. 345/684 |
| 5,826,220 | A * | 10/1998 | Takeda et al. ...................... 704/7 |
| 6,792,409 | B2 * | 9/2004 | Wutte ............................ 704/276 |
| 2003/0040899 | A1 * | 2/2003 | Ogilvie ............................. 704/2 |
| 2007/0239424 | A1 | 10/2007 | Payan |
| 2009/0306980 | A1 | 12/2009 | Shin |
| 2010/0008582 | A1 * | 1/2010 | Kim et al. ...................... 382/177 |
| 2011/0040552 | A1 * | 2/2011 | Van Guilder et al. ............. 704/4 |

* cited by examiner

*Primary Examiner* — Farzad Kazeminezhad
(74) *Attorney, Agent, or Firm* — LeighAnn Weiland; Veronica Weinstein (57) ABSTRACT

A computer method and an electronic device enable a user to lookup words and insert new words in a text based on the results of the look up. The method executed by the device includes: providing a user with a capability to select at least one word in a text displayed on the screen of the device; performing a dictionary lookup of the identified word so as to determine translation alternatives of the identified word; displaying at least some of the translation alternatives; selecting one of the displayed alternatives; determining its word forms, wherein the word forms consist of gender, number, grammatical tense and grammatical variations of the same word; selecting one of the word forms; and inserting the selected word from in the text.

32 Claims, 6 Drawing Sheets

Sie wusste genau, dass die Schmerzen in ihrer Brust davon noch schlimmer wurden, der Husten, die Halsschmerzen, alles.

wusste
know - knew; have known; has known;
realize ; perceive; >>

Sie war sterbenskrank, nur wusste das außer ihr niemand, die Ärzte belächelten sie nur, sagten, sie sei kerngesund und das man in ihrem Alter noch nicht sterbenskrank werden könne. Was sie nicht schon alles untersucht hatten: Das Herz war gesund, die Lunge war gesund, die

*Fig. 5A*

She knew genau, dass die Schmerzen in ihrer Brust davon noch schlimmer wurden, der Husten, die Halsschmerzen, alles.

Sie war sterbenskrank, nur wusste das außer ihr niemand, die Ärzte belächelten sie nur, sagten, sie sei kerngesund und das man in ihrem Alter noch nicht sterbenskrank werden könne. Was sie nicht schon alles untersucht hatten: Das Herz war gesund, die Lunge war gesund, die

INSERTION OF TRANSLATION IN DISPLAYED TEXT CONSISTING OF GRAMMATICAL VARIATIONS PERTAINING TO GENDER, NUMBER AND TENSE

CROSS-REFERENCE TO RELATED APPLICATIONS

This application is a Continuation-in-part of U.S. patent application Ser. No. 13/006,813 filed on Jan. 14, 2011 which claims the benefit of priority to U.S. Patent Application No. 61/294,947 filed on Jan. 14, 2010. The disclosures of the above applications are incorporated herein by reference to the extent that such disclosures are not inconsistent with this application.

FIELD

The present disclosure is directed towards looking up words on a display screen and inserting translated words or word combination in a text.

BACKGROUND

Electronic dictionaries are used to look up individual words and word combinations by users who are reading printed texts or texts displayed on a computer screen. Users may interact with electronic dictionaries in different ways.

There are a plethora of electronic devices with display screens capable of displaying text. These devices are suitable for using electronic dictionaries which may be installed locally, i.e. on the user's computer or portable device (such as smartphones, PDAs, cell phones, digital photo or video cameras, e-book readers, and other gadgets), provided on a local area network, or available over the Internet.

Many of the aforesaid devices include advanced displays and associated logic capable of supporting non-keyboard input methods. For example the devices may support pen-based input, or touch-based input.

Many devices, for example, mobile phones, smartphones, pad tablets, or e-books, have small screens, which do not allow a user to open several windows and simultaneously use several applications without frequently switching between them. A small screen makes a text translation process difficult and there is a need to integrate a dictionary with a portable device such that a user may conveniently perform text translation on a small screen.

SUMMARY

The disclosed method and system displays meanings and translations of words and word combinations using electronic dictionaries and enables a user to select and insert an acceptable translation in a text.

In one embodiment, the method comprises: touching a touch screen of an electronic device with a finger, a stylus, or any other suitable object, or aiming a cursor on a word; establishing coordinates of the touch or the cursor location; identifying a word or a word combination chosen by the user; looking up the identified word or the word combination in a dictionary; displaying an abridged version of a relevant dictionary entry, for example, in a balloon or in a pop-up window on the screen of the electronic device; providing a choice to a user of several proposed alternatives of translation including a selection of word forms (such as gender, number, grammatical tense, and other grammatical variations of a word); and inserting a selected alternative of the translation of a word or word combination in the text. While the description refers to translation and provides examples of translation from one language to another, it should be noted that the present disclosure is equally applicable to word look-ups and replacements in the same language. In addition to the foreign language translation, the "translation" words include replacement words in the same language, for example, synonyms.

Electronic dictionaries may comprise a software program and dictionary data. The program may include a shell, which provides a graphical user interface, morphology models to provide inflected forms, context search that uses an index, a teaching module, and other features. The dictionaries may be stored in various locations including on the computer device, such a portable device, or on a server in a local area network (LAN) or a wide area network (WAN), such as the Internet.

DETAILED DESCRIPTION

The disclosed electronic device allows a user to quickly obtain meanings and translations of words displayed as part of a text from electronic dictionaries and to insert an acceptable alternative of translation of such a word or word combination in the text while reading or translating the text on a display screen of the electronic device. The meanings and translations may be displayed in a balloon, in a pop-up window, as subscript, as superscript, or in any other suitable manner, when the user touches a word on the display screen or aims a cursor at a word.

Figure 1:
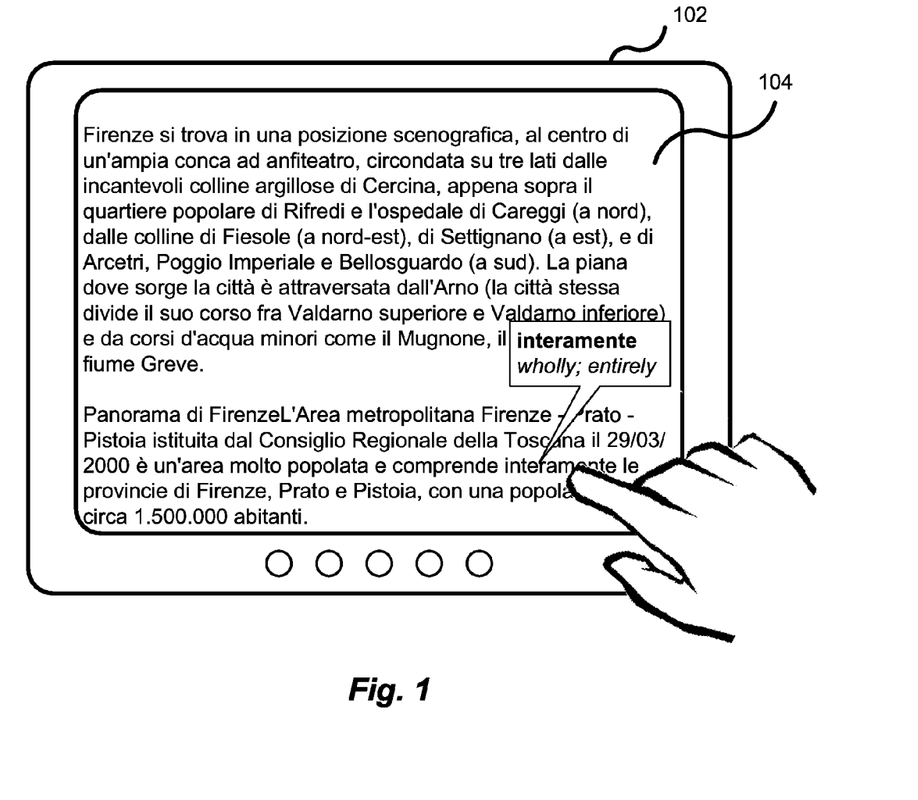
FIG. 1 shows an example of displaying a dictionary entry of a word touched by a user on a touch screen of an electronic device.

The disclosed device displays word translations on a screen of an electronic device. FIG. 1 of the drawings illustrates an example of an electronic device 102, comprising a display screen 104. The content presented on the display screen or touch screen 104 may be outputted by an application (e.g., Word, Notepad, Adobe, e-book reader, a Web Browser, e-mail, a text message, image display, or another appropriate application) that provides text to the display screen 104. When the user touches an area on the display screen 104 with a finger, a stylus or with any other suitable object and there is a word or word combination in the area, a balloon with a translation appears displaying an abridged version of the relevant dictionary entry.

The Italian text of FIG. 1 states the following: "Florence is situated in a scenic location: the center of a large amphitheater, surrounded on three sides by the beautiful hills of clay Cercina, slightly above the popular district of Rifredi and Careggi Hospital (in the north), by the hills of Fiesole (in the northeast), Settignano (in the east), and Arcetri, Poggio Imperiale, Bellosguardo (in the south). The plain, where the city towers up, is crossed by the Arno (the city itself is divided by it between Upper Valdarno and Lower Valdarno) and by smaller rivers such as the Mugnone, Terzolle and by the river Greve. Metropolis of Florence—Prato—Pistoia, established by the Regional Council of Tuscany on 29 Mar. 2000, is a very populated, with a population of about 1,500,000 inhabitants, and includes entirely the provinces of Florence, Prato and Pistoia."

Figure 6:
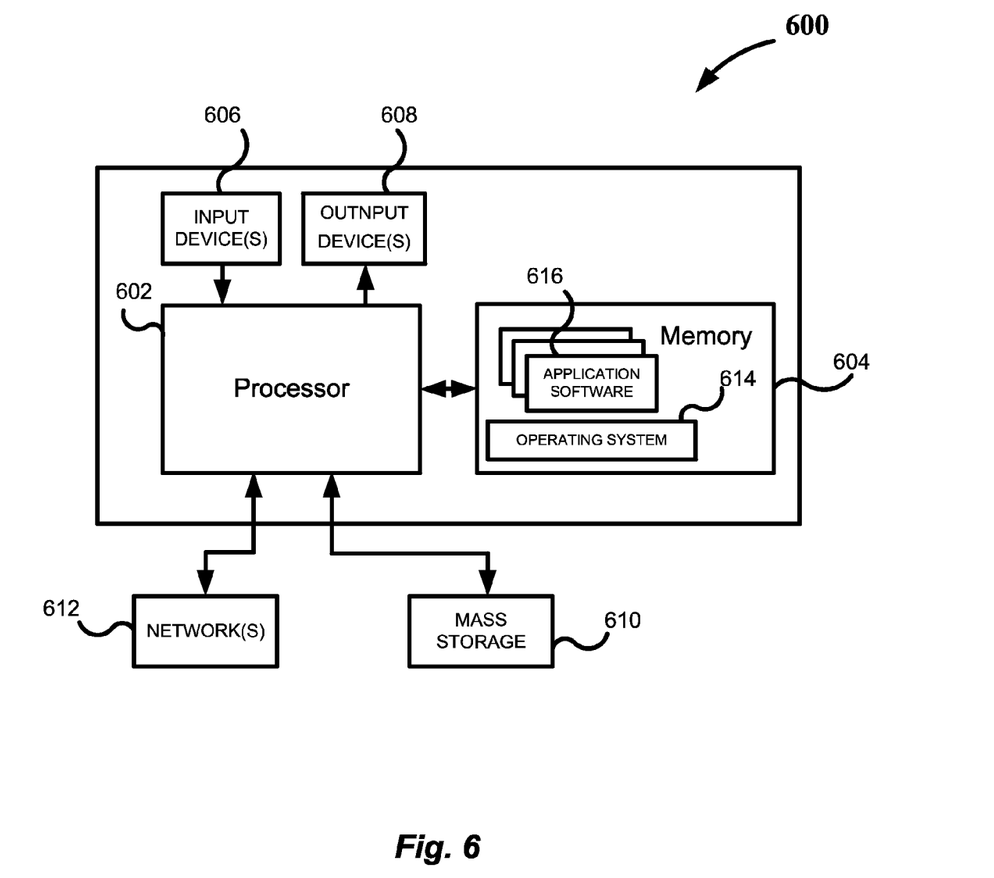
FIG. 6 shows exemplary architecture for implementing the electronic device.

The electronic device 102 may comprise a computer system, such as a general purpose computer, embodied in different configurations such as a desktop personal computer (PC), laptop computer, smartphone, cell phone, digital camera, or another gadget having a display screen. FIG. 6 of the drawings shows exemplary hardware and system architecture for implementing electronic device 102 in accordance with one embodiment.

Electronic device 102 may include a client dictionary application and one or more local dictionaries. Additionally or alternatively to a local dictionary, the application may be able to access one or more remote dictionaries located on a remote server via network connection to the server, e.g. over the Internet.

To look up words and word combinations that appear in non-text files, for example in JPG, TIFF or PDF files, the user's electronic device may include additional Optical Character Recognition (OCR) software which identifies the region on the image where the word or word combination is located and then converts the image in the region into a text format. Optical Character Recognition may also be performed using a remote server, which receives an image and an identified area from the device, applies OCR processing so as to ascertain the word or words at issue, and returns the recognized word or words to the device. The remote server may be accessible via a data path that includes a wireless data path, internet connection, Bluetooth, etc.

Figure 2:
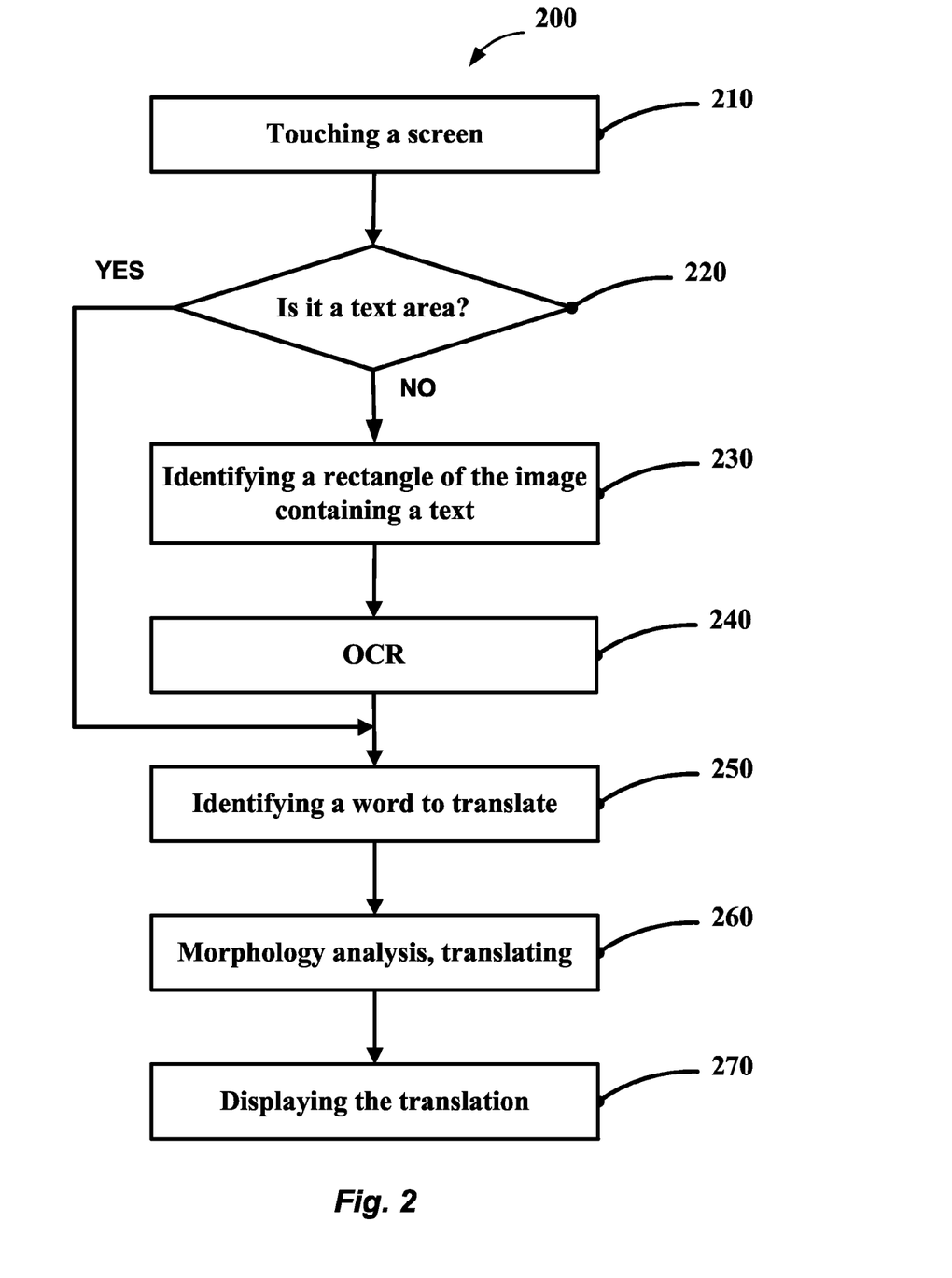
FIG. 2 shows a flowchart of operations performed by dictionary software during translation of an indicated word or word combination.

FIG. 2 shows a flowchart of operations performed by the device in connection with the dictionary application. When the user reads a text on the display screen 104 of the electronic device 102 and wishes to look up a word or word combination, the user simply points to the word or word combination with a mouse cursor or touches the corresponding region on the display screen 104 with a finger, a stylus or any other suitable object.

The touching or aiming a cursor 210 initiates a process that enables the user to see an abridged dictionary entry for the word or the word combination. Next, the electronic device 102 takes advantage of the screen's ability to establish the coordinates of the area of touching or aiming and matches these coordinates against the image on the screen. In one embodiment, when the touch screen senses the touching of the screen 104, e.g. by finger, touch coordinate information corresponding to the touching is conveyed to the dictionary software application via the operating system. Techniques that determine coordinates corresponding to the area of touching typically depend on the type of the touch screen which may be resistive, matrix, capacitive, based on surface acoustic waves, infrared, optical imaging, based on dispersive signal technology, acoustic pulse recognition, or another suitable technology. In another embodiment, the touch screen may have a program interface, and the dictionary software application may receive coordinates corresponding to the touching directly from the touch screen through the program interface.

After receiving the coordinates, the dictionary software application determines whether the corresponding point is in a text area (220) of a currently displayed document. If the coordinates point to a text area, the word region pointed by a user is identified (250). A word region may contain one word or a word combination. In one embodiment, a word combination relates to one or more words, adjacent to the pointed to word, which, in combination, have a meaning defined in the dictionary. Consequently the system checks for a dictionary meaning not only for the identified word itself but for its combination with adjacent words, if any. The identified word or word combination is passed as a query to the dictionary.

If the coordinates point to an area encoded as an image (e.g. PDF, JPG, TIF, and other picture or image formats where words are not stored as collections of characters), an OCR software is applied. At step 230, OCR software identifies a rectangular region corresponding to the user input that contains text. To speed up OCR, the OCR software may identify a smallest rectangular image that contains an image of one word or a word string in the area touched by the user. Alternatively, the entire document or its portion may be processed by the OCR software.

At step 240, the OCR software is applied to the identified rectangular region. The result of the OCR processing is a word or word combination represented by a string of characters. At the OCR step, morphology dictionaries, which include the inflected forms of the words, may also be used, as higher OCR accuracy and error correction are often achieved by comparing the recognition results with word forms in the morphology dictionary. At step 250, a word or words, selected on the screen and determined, if necessary using OCR processing, are identified as a dictionary query.

At the step 260, the query is passed to a dictionary or a set of dictionaries that may be preliminarily selected by user. Dictionary software may use default one or more dictionaries or a user may specify a desired dictionary. A default dictionary on a given subject may be selected if the dictionary software determines that the text belongs to a specialized subject. Additionally, the electronic dictionary includes a morphology module, so that the query word or word combination need not be in the base, or "dictionary" form—the morphology module identifies the base form of an inflected form. If more than one base forms are possible, the morphology module identifies the alternatives.

At the step 260, the morphology of the selected word is analyzed. The morphology analysis returns a set of possible base, or "dictionary," forms of the word. For the obtained base forms, dictionary meanings/translations are retrieved. If the entry is to be shown in a pop-up window, as subscript or if the screen has a small size as in the case of a mobile device, the most likely (frequent) translation or the translation of the most likely (frequent) part of speech may be selected. Finally, at step 270, the meaning/translation is displayed on the display screen 104 of the electronic device 102. The translation may be displayed in a balloon, in a pop-up window, as a subscript, or in any other suitable manner. A translation of a word combination, if found, is also displayed along with the translation of the identified word.

The electronic device 102 may access not only a bilingual dictionary, but also a monolingual dictionary with definitions, or any other reference book, a travel guide, and the like. Additionally the recorded or audio pronunciation of the identified and recognized word and/or its translation may be played back, for example, by selecting this feature preliminarily or also by a touch, which is of value to language learners. Translations may also be obtained from a remote server. The remote server may be accessible via a data path that includes a wireless data path, internet connection, Bluetooth, etc. For example, a dictionary may be an Internet-based resource identified by a user. In this case, the selected word or several words are provide to the dictionary over the Internet and the results of the look up are returned to the device for display.

Although, in the above embodiments, user input was based on finger touches, it is to be understood that in other embodiments, other user input methods based on haptic input methods in general, or other pointing methods, e.g. cursor location or pen/stylus based methods may be used.

The disclosed electronic devices may include any electronic device that has a display screen and application programs to display text or text image on the display screen. As such, the electronic devices may include a mobile phone, a smartphone, a digital camera, a dedicated reading device or e-book reader, a PC, a notebook computer, a tablet PC, or another device. There are a variety of touch screen technologies. The touch screen may be resistive, matrix, capacitive, based on surface acoustic waves, infrared, optical imaging, based on dispersive signal technology or acoustic pulse recognition, etc.

The disclosed dictionary software application provides not only word translations on a screen of an electronic device, but also a capability to perform an insertion of a translated word or a word combination in the text. Such an insertion capability facilities translation of a text displayed on a relatively small screen. It is particularly useful, for example, for users of smartphones or other portable devices. A user may translate a text by inserting translation words and then save the translated text or forward it to another user.

Figure 3A:
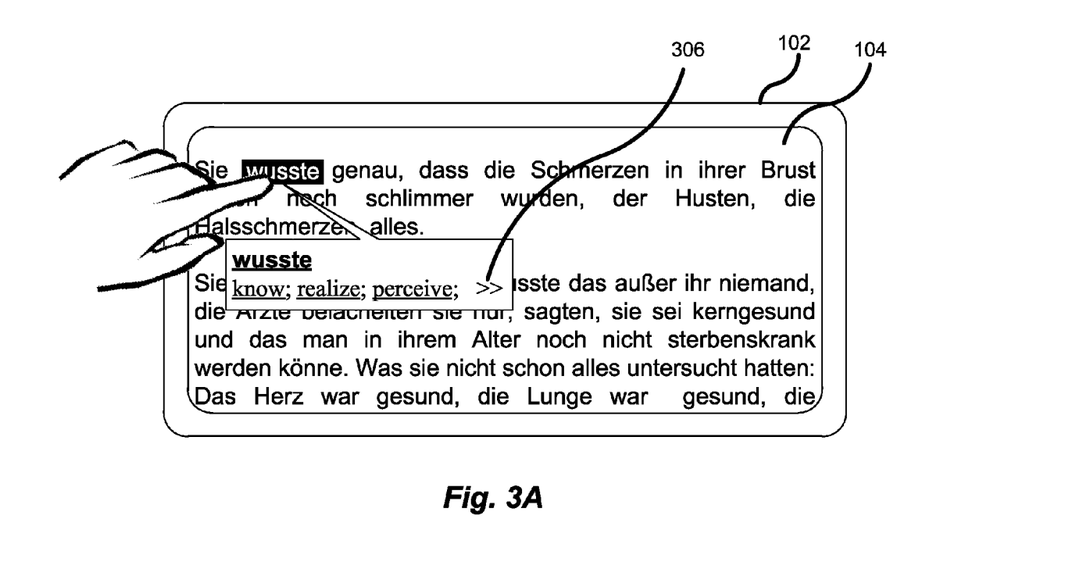
FIG. 3A shows an example of displaying alternative translations of a word touched/clicked by a user on a screen of an electronic device.

Referring to FIG. 3A of the drawings, and, as discussed in connection with FIG. 1, the content presented on the display screen or touch screen 104 of an electronic device 102 may be outputted by any application (e.g., Word, Notepad, Adobe, e-book reader, a Web Browser, e-mail, a text message, or another appropriate application) that displays text on the screen 104. When the user touches an area on the display screen 104 with a finger, a stylus or with any other suitable object or directs a cursor on a word and there is a word or word combination in the area, one or more translation alternatives of the selected word or word combination is displayed as a balloon or a pop-up window, as a subscript or in any other suitable manner.

The German text appearing in FIGS. 3A, 3B, 5A, and 5B is translated as follows: "She knew that the pain in her chest became worse, the cough, sore throat, everything. She was deathly ill, but nobody else but she knew it, doctors just laughed and said that she was perfectly healthy and that no one at her age could be terminally ill. She checked everything: The heart was healthy, the lungs were healthy, the"

In most cases a word can have several meanings and therefore there are several alternative translations into another language. The advantage of the disclosed system is not only in the simplification of word-by-word translation for a user, but also in providing the capability of selecting an appropriate proposed translation alternative. Word forms for a chosen translation alternative can be proposed by the application and selected by a user. Word forms may include tense forms of verbs, singular and plural forms, and other variations of the words if appropriate.

Figure 4:
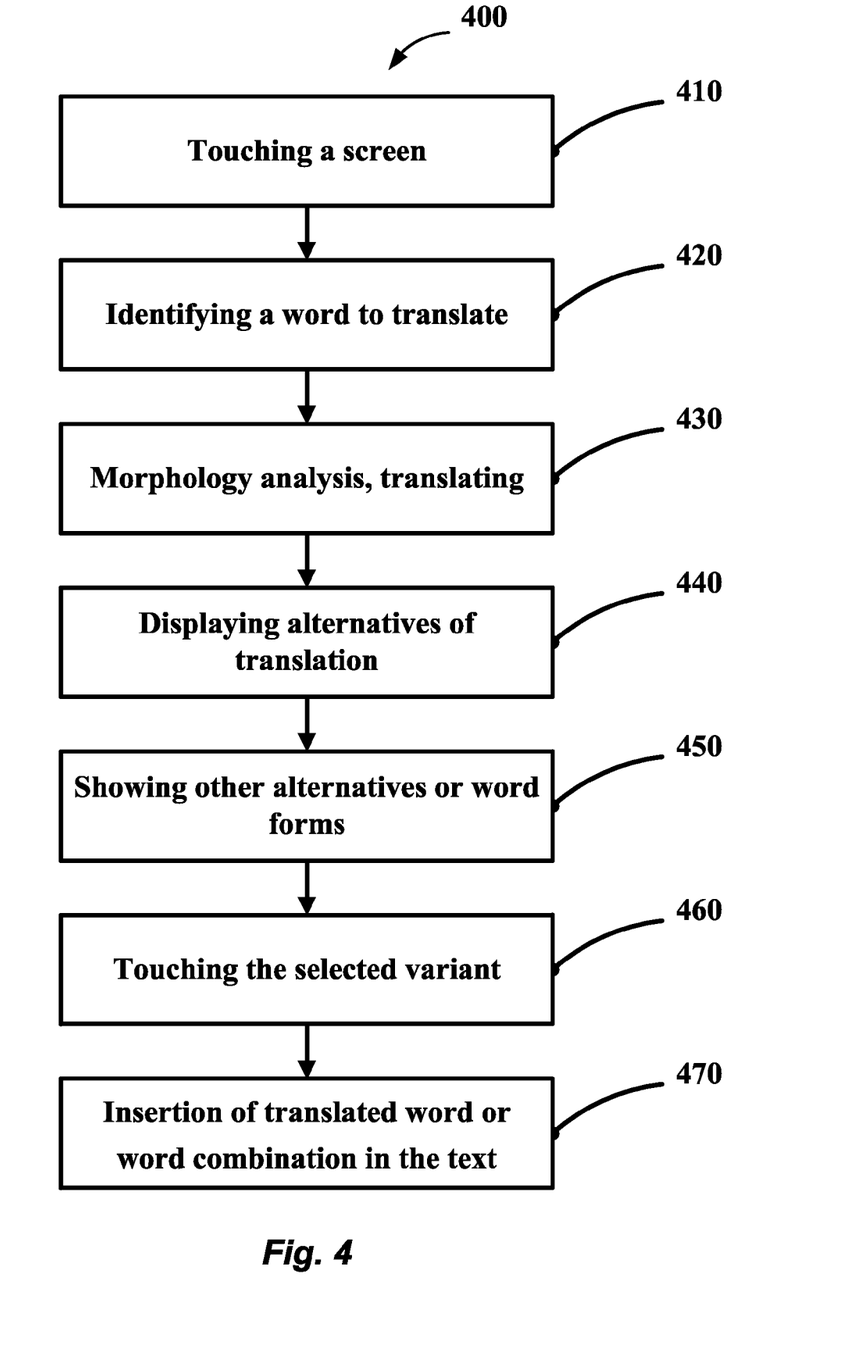
FIG. 4 shows a flowchart of operations performed by dictionary software in connection with inserting a translated word or word combination in the displayed text.

FIG. 4 illustrates a flowchart of operations for insertion of a translated word. When a user wishes to translate a word or word combination, the user simply points to the word or word combination with a mouse, cursor or touches the corresponding region on the display screen 104 with a finger, a stylus or any other suitable object.

The touch or aiming a cursor 410 initiates a process that enables the user to see an abridged dictionary entry for the word or the word combination similarly to step 210. Next, the electronic device 102 takes advantage of the touch screen's ability to establish the coordinates of a touch and matches these coordinates against the display on the screen, or uses coordinates of a cursor for this purpose.

After receiving the coordinates, the word region and the corresponding word query are identified at the step 420. A word region may contain one word or a word combination. The identified word or word combination is then passed as a query to a dictionary.

At the step 430, the query is passed to a dictionary or a set of dictionaries that are used by default or have been preliminarily selected by a user. Dictionaries may be local to the device or remote, e.g. accessible over the Internet. Additionally, a preferred electronic dictionary includes a morphology module so that the query word or word combination need not be in the base, or "dictionary" form—the morphology module identifies the base form of an inflected form. If more than one base forms are possible, the morphology module identifies the possible alternatives.

At step 430, the morphology of the selected word is analyzed. In one embodiment, the morphology analysis returns a set of possible base forms of the word. For the obtained base forms, dictionary meanings/translations are retrieved. If the entry is to be shown in a pop-up window, as subscript or if the screen has a small size, as in the case of a mobile device, the most likely (frequently occurring) translation(s) or the translation of the most likely (frequently occurring) part of speech may be selected. If there are words adjacent to the selected word, the dictionary is checked for the word combination and, if the translation has been found, it is displayed to the user.

At the step 440, most likely alternatives of translation of the selected word or words are displayed on the screen 104 of the electronic device 102. The alternatives of translation may be displayed in a balloon, in a pop-up window, as a subscript, or in any other suitable manner.

At the step 450, other alternatives of translation may be shown by touching or clicking on a special button or link (306) displayed, for example, within the translation balloon. Relevant word forms of a translation alternative may be shown by clicking on the selected word. Therefore, at step 430 the morphology module identifies relevant word forms, for example, in accordance with the form of the translated word in the original sentence. At step 460, a user may touch/click the selected word form of the selected translation alternative. As a result, at the step 470, a translated word or a word combination is inserted in the original text using the selected word form.

If the original text is in a form of an image as discussed in connection with FIG. 2, OCR processing is applied to the displayed text and the image is replaced with a collection of characters. OCR processing may be provided as a local application on the device or as a remote server capability. To use remote OCR the image is transmitted to the server, for example, via Internet, and the document or a portion thereof in the text format is returned to the device. The selected word or word combination is translated as discussed above and the user selects the appropriate translation alternative and words form for the selected one or more words. The user selection is then inserted in the version of the original text processed by OCR.

FIG. 3A illustrates the translation from German into English of the verb "wusste." When the user touches an area on the screen or directs a cursor on this word, a balloon or pop-up window appears displaying the following alternatives of translation: know; realize; and perceive. At this point, an acceptable alternative of the translation may be chosen by the user. If there are no displayed acceptable alternatives among the shown choices of translation, one may get the complete list of translation alternatives, if not all the translations were originally displayed, by pointing at the button 306.

Figure 3B:
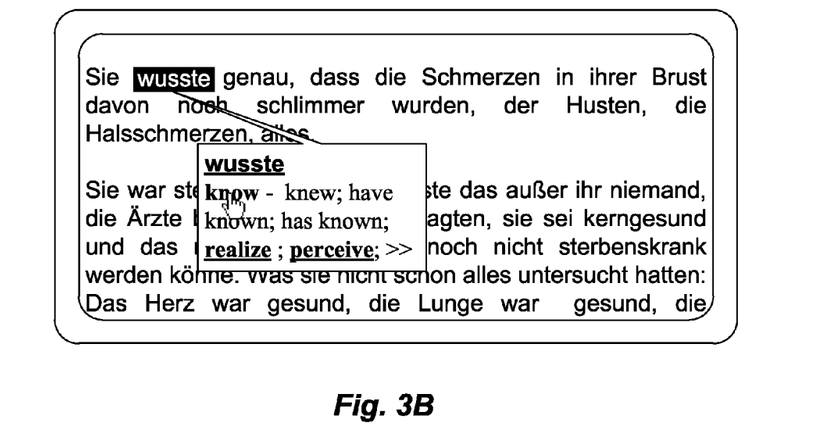
FIG. 3B shows an example of displaying relevant word forms of a chosen alternative of a translation.

In one implementation, the capability of displaying not only a translation of a word, but word forms of the word to be translated is provided. Word forms include grammatical modifications of the translated word such as tense forms of verbs and a noun in a plural form. All the appropriate word forms can be shown by clicking or touching on the chosen translation as illustrated in FIG. 3B.

The German verb "wusste" is used in the text in a simple past tense. Therefore word forms in the past tense will be proposed. By clicking on or touching the chosen translation, which is in this example is the verb "know," several forms in past tense are proposed. For example for the choice "know," the system displays: "knew, have known, has known." Similarly, if another alternative of translation were chosen, e.g. "realize," word forms of this word would be offered.

Figure 5A:
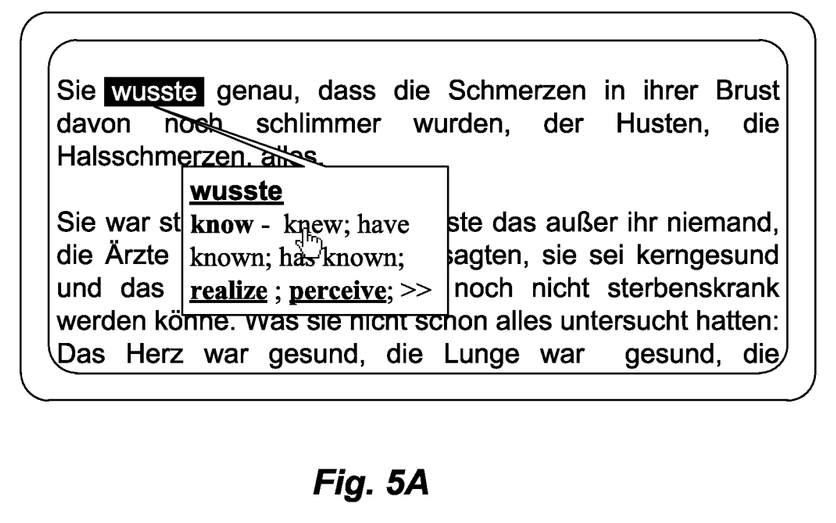
FIG. 5A shows an example of choosing an acceptable word form by touching/clicking it.
Figure 5B:
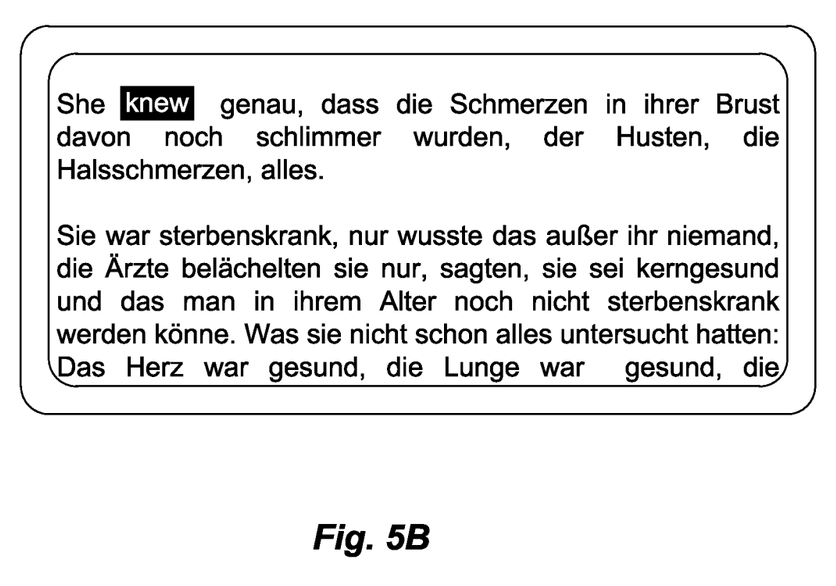
FIG. 5B shows a result of an insertion of translated word in the text.

An insertion of a word or word combination can be performed by clicking on or touching the most acceptable word form. For example, in this case, the past simple tense "knew" is most appropriate. Thus, by clicking or touching on the verb "knew," as shown in FIG. 5A, this word is inserted in the text (FIG. 5B). The place of insertion with respect to a touched word may be selected by the user in advance. The translation may be inserted before, after, or instead of the touched word.

For any word in the pop-up window (for a word being translated or any variant of translation) a user may also obtained through the dictionary software its detailed translation and/or other reference information, such as examples of use, translations from dictionaries on various subjects (e.g. Universal, Computer, Economics, Science, etc.). For example a detailed translation may be requested by a double touch/click on the word of interest, or in any other manner specified for opening an entry with a detailed translation. The detailed and/or specialized information may be provided by dictionary resources stored in the device or accessible over the internet or a combination thereof, depending on applicable design trade-offs.

Also the interface of pop-up windows with alternatives of the translation may be customized. For example, by clicking or touching on the acceptable variant of translation in the pop-up window, in one case, the window may be expanded to include word forms or, in another case, a new window with just the chosen translation variant and its word forms would be displayed. The maximum number of alternatives offered in a pop-up window, vocabularies used during translation, the types of word form and their presentation on the display, and other relevant characteristics may be user-selected as well.

Also the capability of displaying only the most relevant word forms in the pop-up window may be selected by the user. So in the example discussed above, variants of translation will be offered in the following manner: knew, have known, realized, have realized, perceived, have perceived. Thus, a user may choose one of these proposed variants and insert it in the text. Alternatively, a user may request additional reference explanation, such as examples of usage, for any of the proposed variants. Also, the system may be prompted to pronounce any of the translation alternatives.

This method is especially useful for word-by-word translation of a text or for writing a text message in a foreign language. For example, it can be used in connection with Text Document, Word, e-mail, text message, address bar or input string in a browser. The disclosed method reduces time required for translation, since a user does not need to open multiple windows on a screen, switch between applications, remember the correct spelling of the desired word, and input translation in the text. Such advantages are particularly useful in devices with small screen (e.g. mobile devices) for saving space on the screen.

FIG. 6 of the drawings shows hardware and system architecture 600 that may be used to implement the user electronic device 102 in accordance with one embodiment of the invention in order to translate a word or word combination, to display the found translations to the user, to chooses the alternative of the translation and its word form, and to insert the choice in the displayed text. Referring to FIG. 6, the system 600 typically includes at least one processor 602 coupled to a memory 604 and having touch screen among output devices 608, which, in this case, is serves also as an input device 606. The processor 602 may be any commercially available CPU. The processor 602 may represent one or more processors (e.g. microprocessors), and the memory 604 may represent random access memory (RAM) devices comprising a main storage of the system 600, as well as any supplemental levels of memory, e.g., cache memories, non-volatile or back-up memories (e.g. programmable or flash memories), read-only memories, etc. In addition, the memory 604 may be considered to include memory storage physically located elsewhere in the hardware 600, e.g. any cache memory in the processor 602 as well as any storage capacity used as a virtual memory, e.g., as stored on a mass storage device 610.

The system 600 also typically receives a number of inputs and outputs for communicating information externally. For interface with a user or operator, the hardware 600 usually includes one or more user input devices 606 (e.g., a keyboard, a mouse, touch screen, imaging device, scanner, etc.) and a one or more output devices 608, e.g., a display device and a sound playback device (speaker). The system 600 preferably includes a touch screen device (for example, a touch screen), or an interactive whiteboard, or another device which allows the user to interact with a computer by touching areas on the screen. The keyboard is not obligatory for the embodiments.

For additional storage, the hardware 600 may also include one or more mass storage devices 610, e.g., a removable drive, a hard disk drive, a Direct Access Storage Device (DASD), an optical drive, e.g. a Compact Disk (CD) drive and a Digital Versatile Disk (DVD) drive. Furthermore, the system 600 may include an interface with one or more networks 612 (e.g., a local area network (LAN), a wide area network (WAN), a wireless network, and/or the Internet among others) to permit the communication of information with other computers coupled to the networks. It should be appreciated that the system 600 typically includes suitable analog and/or digital interfaces between the processor 602 and each of the components 604, 606, 608, and 612 as is well known in the art.

The system 600 operates under the control of an operating system 614, and executes various computer software applications 616, components, programs, objects, modules, etc. to implement the techniques described above. In particular, the computer software applications include the client dictionary application and also other installed applications for displaying text and/or text image content such a word processor, dedicated e-book reader etc. Moreover, various applications, components, programs, objects, etc., collectively indicated by reference 616 in FIG. 6, may also execute on one or more processors in another computer coupled to the system 600 via a network 612, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described.

The invention claimed is:

1. A computer-implemented method, comprising:
    identifying, based on user input, a word in a text displayed on a screen of a device, the text consisting of a plurality of words to be translated;
    performing a dictionary lookup of the word so as to determine translation alternatives of the word;
    displaying a plurality of the translation alternatives of the word on the screen of the device;
    selecting, based on user input, a preferred translation alternative from the plurality of translation alternatives;
    determining and displaying a plurality of word forms of the preferred translation alternative,
    wherein the word forms consist of gender, number, grammatical tense, and grammatical variations of same word;
    selecting, based on user input, a selected word form from the plurality of word forms of the preferred translation alternative;
    and inserting the selected word form in the text.

2. The method of claim 1, further comprising, if the text has been stored as image data, performing a text recognition operation to extract textual information from the image data representing the text.

3. The method of claim 2, wherein performing the text recognition operation comprises applying an optical character recognition technique.

4. The method of claim 3, wherein performing the text recognition operation comprises comparing a recognition result with similar word forms obtained from a morphological dictionary.

5. The method of claim 1, wherein the user input comprises one of pointer-based or haptic-based input.

6. The method of claim 5, wherein the haptic-based input comprises touch-based inputs.

7. The method of claim 5, wherein the pointer-based input comprises cursor-based inputs.

8. The method of claim 1, wherein the device is a handheld device with a small display area.

9. The method of claim 8, wherein the device is a smart phone and includes a cellular telephone capability.

10. The method of claim 1, wherein the plurality of translation alternatives includes most likely translations corresponding to the word.

11. The method of claim 10, wherein a maximum number of translation alternatives in the plurality of translation alternatives is determined by the user.

12. The method of claim 1, wherein the displaying of a plurality of word forms of the preferred translation alternative comprises displaying the plurality of word forms in the form of one of a pop-up window, superscript text, subscript text, and a text balloon.

13. The method of claim 12, wherein at least one of the translation alternatives and the word forms are displayed in the same pop-up window or a text balloon.

14. The method of claim 1, wherein the translation alternatives are in a language different from the language of the word.

15. The method of claim 1, wherein the translation alternatives and the word are in the same language.

16. The method of claim 1, wherein inserting the selected word form in the text includes replacing the word with the selected word form, the text being in a first language and the selected word form being in a second language.

17. The method of claim 1, wherein inserting the selected word form in the text includes adding the selected word form to the text adjacent the word.

18. The method of claim 1, further comprising displaying additional ones of the translation alternatives in response to the user input.

19. The method of claim 1, wherein a representation of the displayed text is stored in the device.

20. The method of claim 1, wherein the text is at least a part of one of the following: a document, a text message, an e-mail, or a browser input.

21. The method of claim 1, wherein the performing the dictionary lookup comprises performing morphological analysis to identify a base form of the word.

22. The method of claim 1, further comprising looking up the preferred translation alternative in a morphological dictionary, so as to determine the plurality of word forms.

23. The method of claim 1 wherein the plurality of word forms are selected based on the word form of the word.

24. The method of claim 1, further comprising displaying the plurality of translation alternatives of the word in base form.

25. The method of claim 1, further comprising displaying the plurality of translation alternatives as word forms consistent with the word form of the word.

26. The method of claim 1, further comprising displaying a detailed translation based on a specialized dictionary for one of the translation alternatives in response to a user input.

27. The method of claim 1, wherein performing the dictionary lookup comprises accessing at least one dictionary selected from the group consisting of a local dictionary and a remote dictionary.

28. The method of claim 1, further comprising playing back an audio pronunciation associated with a result of the dictionary lookup.

29. The method of claim 1 wherein identifying, based on user input, a word in a text displayed on a screen of a device comprises:
   detecting user input associated with a portion of the display screen;
   establishing coordinates associated with the user input; and
   identifying a portion of the text associated with the coordinates.

30. The method of claim 1, further comprising displaying new text comprising the text with the selected word form inserted therein.

31. An electronic device, comprising:
   a processor; and
   a memory coupled to the processor, the memory storing instructions which when executed by the processor cause the system to perform a method comprising:
   identifying, based on user input, a word in a text displayed on a screen of a device, the text consisting of a plurality of words to be translated;
   performing a dictionary lookup of the identified word so as to determine translation alternatives of the word;
   displaying a plurality of the translation alternatives of the identified word on the screen of the device;
   selecting, based on user input, a preferred translation alternative from the plurality of translation alternatives of the identified word;
   determining and displaying a plurality of word forms of the preferred translation alternative,
   wherein the word forms consist of gender, number, grammatical tense, and grammatical variations of same word;
   selecting, based on user input, a selected word form from the plurality of word forms of the preferred translation alternative;
   and inserting the selected word form in the text.

32. A non-transitory computer-readable medium having stored thereon a sequence of instructions which when executed by a system cause the system to perform a method, comprising:
   identifying, based on user input, a word in a text displayed on a screen of a device, the text consisting of a plurality of words to be translated;
   performing a dictionary lookup of the identified word so as to determine translation alternatives of the word;
   displaying a plurality of the translation alternatives of the identified word on the screen of the device;
   selecting, based on user input, a preferred translation alternative from the plurality of translation alternatives of the identified word;
   determining and displaying a plurality of word forms of the preferred translation alternative,
   wherein the word forms consist of gender, number, grammatical tense, and grammatical variations of same word;
   selecting, based on user input, a selected word form from the plurality of word forms of the preferred translation alternative;
   and inserting the selected word form in the text.

* * * * *